United States Patent
Fukushige et al.

(10) Patent No.: US 10,875,530 B2
(45) Date of Patent: Dec. 29, 2020

(54) TRAVEL CONTROL METHOD AND TRAVEL CONTROL DEVICE FOR DRIVE-ASSISTED VEHICLE

(71) Applicant: Nissan Motor Co., Ltd., Yokohama (JP)

(72) Inventors: Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/638,809

(22) PCT Filed: Aug. 30, 2017

(86) PCT No.: PCT/JP2017/031167
§ 371 (c)(1),
(2) Date: Feb. 13, 2020

(87) PCT Pub. No.: WO2019/043832
PCT Pub. Date: Mar. 7, 2019

(65) Prior Publication Data
US 2020/0189582 A1 Jun. 18, 2020

(51) Int. Cl.
*B60W 30/10* (2006.01)
*B60W 40/072* (2012.01)
*B60W 40/114* (2012.01)
B60W 60/00 (2020.01)
G05D 1/00 (2006.01)

(52) U.S. Cl.
CPC .......... *B60W 30/10* (2013.01); *B60W 40/072* (2013.01); *B60W 40/114* (2013.01); *B60W 60/001* (2020.02); *B60W 2520/10* (2013.01); *B60W 2520/12* (2013.01); *B60W 2520/125* (2013.01); *B60W 2520/14* (2013.01); *B60W 2552/30* (2020.02); *G05D 1/0088* (2013.01); *G05D 2201/0213* (2013.01)

(58) Field of Classification Search
None
See application file for complete search history.

(56) References Cited

U.S. PATENT DOCUMENTS

2016/0259338 A1* 9/2016 Nakamura ...... B60W 30/18145
2017/0123434 A1 5/2017 Urano et al.

FOREIGN PATENT DOCUMENTS

| CN | 101020453 A | 8/2007 |
| CN | 101607554 A | 12/2009 |
| CN | 101945786 A | 1/2011 |

(Continued)

*Primary Examiner* — Tamara L Weber
(74) *Attorney, Agent, or Firm* — Global IP Counselors, LLP

(57) ABSTRACT

A travel control device includes a controller for controlling travel of an autonomous host vehicle. The controller detects left and right lane boundaries and controls travel of the host vehicle based on a result of lane boundary detection. The controller includes a road geometry distinguishing unit and a rate limiter unit. The road geometry distinguishing unit distinguishes a curve, and a direction of the curve, based on road geometry information. When traveling through the curve, the rate limiter unit sets a result of lane boundary detection at an inside of a corner to a value for which change in a lateral direction approaching the host vehicle is restricted.

8 Claims, 7 Drawing Sheets

(56) References Cited

FOREIGN PATENT DOCUMENTS

| | | | |
|---|---:|---|---|
| CN | 102795224 | A | 11/2012 |
| CN | 105163994 | A | 12/2015 |
| CN | 106004857 | A | 10/2016 |
| CN | 107074316 | A | 8/2017 |
| DE | 10 2016 221 314 | A1 | 5/2017 |
| EP | 2 461 305 | A1 | 6/2012 |
| JP | 2006-175979 | A | 7/2006 |
| JP | 2008-24042 | A | 2/2008 |
| JP | 2014-133477 | A | 7/2014 |
| JP | 2014-218098 | A | 11/2014 |
| JP | 2015-13545 | A | 1/2015 |
| JP | 5783204 | B2 | 7/2015 |
| JP | 2016-110627 | A | 6/2016 |
| JP | 2016-162191 | A | 9/2016 |
| JP | 6123297 | B2 | 4/2017 |
| WO | 2017/094907 | A1 | 6/2017 |

* cited by examiner

TRAVEL CONTROL METHOD AND TRAVEL CONTROL DEVICE FOR DRIVE-ASSISTED VEHICLE

CROSS-REFERENCE TO RELATED APPLICATIONS

This application is a U.S. national stage application of International Application No. PCT/JP2017/031167, filed on Aug. 30, 2017.

BACKGROUND

Technical Field

The present disclosure relates to a method and device for controlling travel of a drive-assisted vehicle, with which left and right lane boundaries are detected and travel of a host vehicle is controlled based on a result of lane boundary detection.

Background Information

One hitherto known device for controlling vehicle drive-assistance detects left and right lanes, takes positions centered between detected left and right white lines to be a target route, and controls the host vehicle so as to travel along this target route (e.g., see Japanese Laid-Open Patent Application No. 2015-13545—Patent Document 1).

SUMMARY

However, this conventional device cannot keep up with changes in road curvature when traveling through a curve, and lane boundary detection values tend to lag behind. Consequently, results of lane boundary detection at an inside of a corner take on values in a direction approaching the host vehicle. This results in travel that veers toward an outside of a corner in a section of a curve where curvature changes.

The present disclosure focuses on the above problem, it being an object hereof to enable travel that does not veer toward an outside of a corner in a section of a curve where curvature changes.

In order to achieve the above objective, in the present disclosure, a controller is provided that detects left and right lane boundaries and that controls travel of a host vehicle based on a result of lane boundary detection. In a method for controlling travel of a drive-assisted vehicle, a curve, and a direction of the curve, are distinguished based on road geometry information. When traveling through the curve, a result of lane boundary detection at an inside of a corner is set to a value for which change in a lateral direction approaching the host vehicle is restricted.

By setting a result of lane boundary detection at an inside of a corner where lane boundary detection values tend to lag behind to a value for which change in a lateral direction approaching the host vehicle is restricted when traveling through a curve, as described above, it is possible to travel without veering toward an outside of the corner in a section of the curve where curvature changes.

DETAILED DESCRIPTION OF THE EMBODIMENTS

Figure 1:
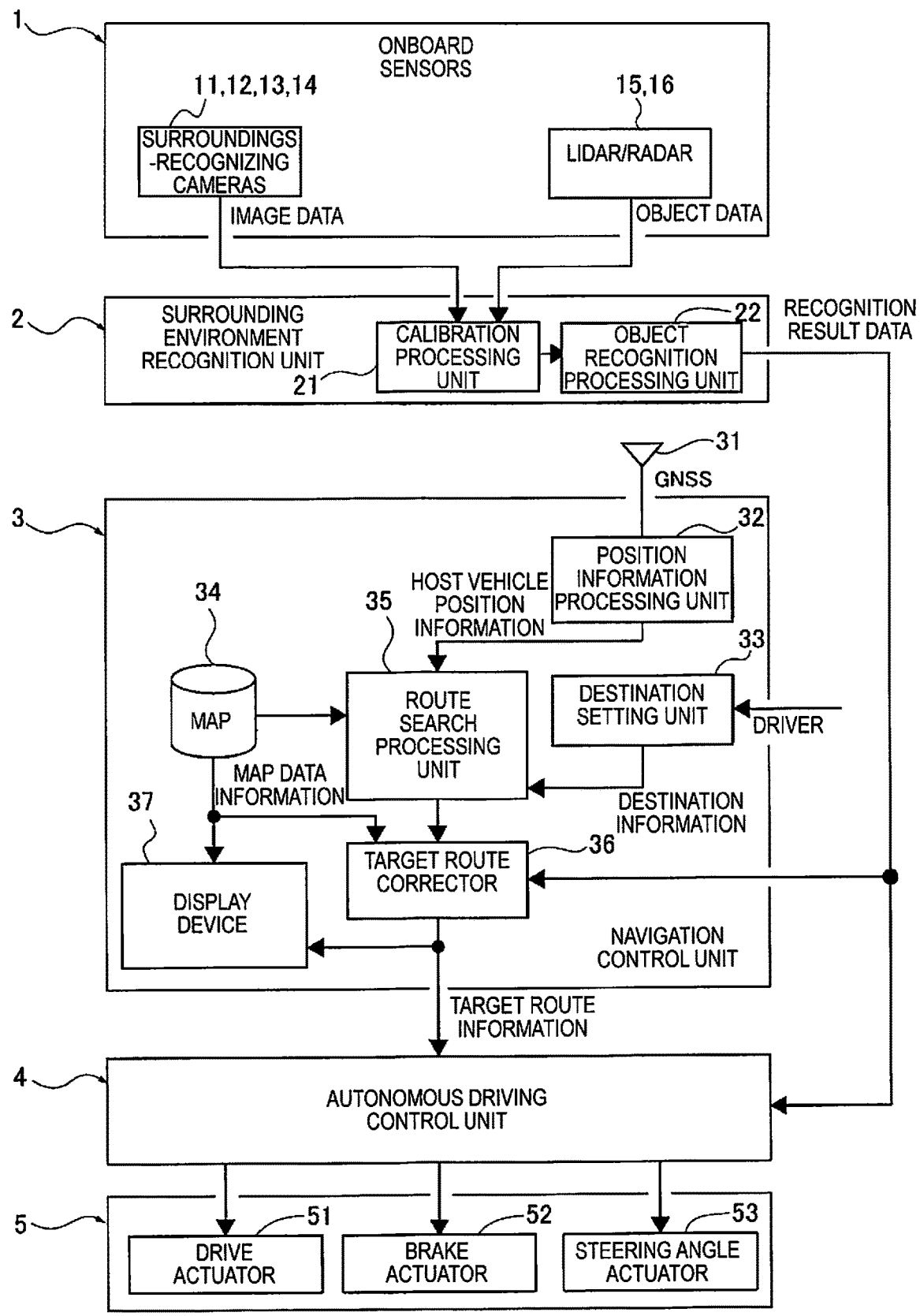
FIG. 1 is an overall system diagram illustrating an autonomous driving control system to which a method and device for controlling travel of a first embodiment have been applied.

A preferred embodiment for implementing a method and device for controlling travel of a drive-assisted vehicle according to the present disclosure will be described below with reference to a first embodiment illustrated in the drawings.

First Embodiment

First, the configuration will be described. The method and device for controlling travel of the first embodiment are applied to an autonomous vehicle (one example of a drive-assisted vehicle) in which steering/drive/braking are automatically controlled according to an autonomous driving mode selection using target route information generated by a navigation control unit. The configuration of the first embodiment will be described under the headings "Overall system configuration," "Detailed configuration of navigation control unit," and "Overall configuration of target route corrector," and "Detailed configuration of rate limiter unit."

Overall System Configuration

Figure 2:
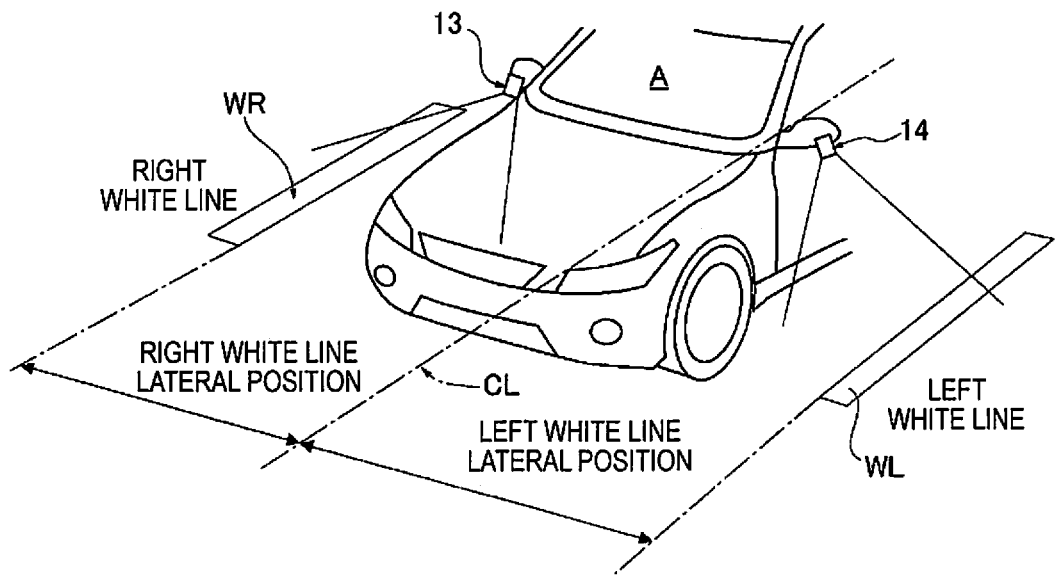
FIG. 2 is a perspective view illustrating, among onboard sensors, a left recognition camera and a right recognition camera of the first embodiment.
Figure 3:
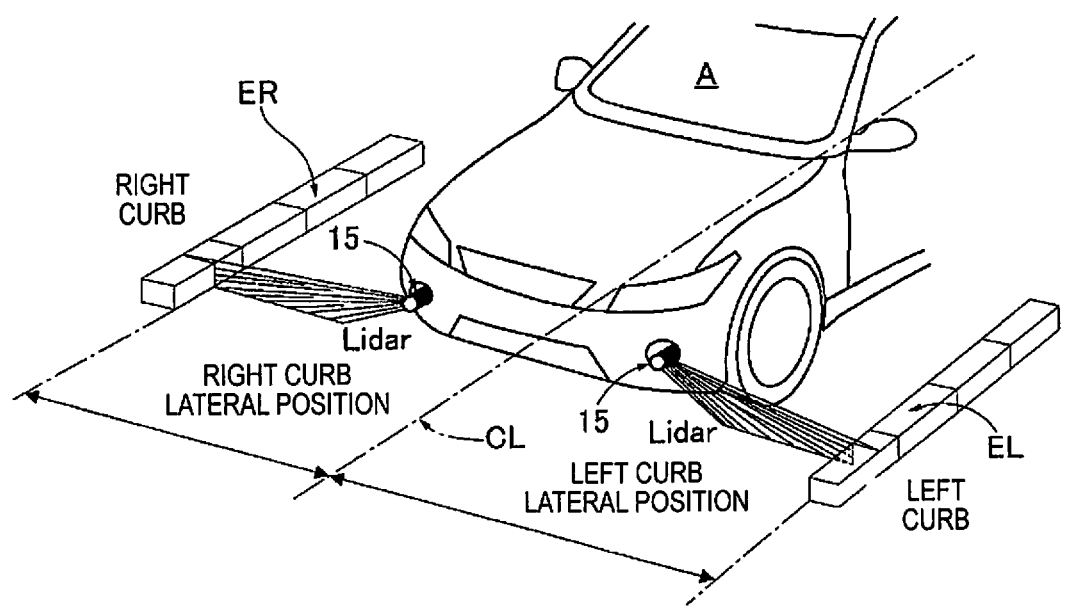
FIG. 3 is a perspective view illustrating, among onboard sensors, lidar provided at left and right positions at the front of a vehicle of the first embodiment.

FIG. 1 illustrates an autonomous driving control system to which the method and device for controlling travel of the first embodiment have been applied. FIG. 2 illustrates, among onboard sensors, a left recognition camera and a right recognition camera. FIG. 3 illustrates, among onboard sensors, lidar provided at left and right positions at the front of a vehicle. The overall system configuration will be described below with reference to FIGS. 1 to 3.

As illustrated in FIG. 1, the autonomous driving control system comprises onboard sensors 1, a surrounding environment recognition unit 2, a navigation control unit 3, an autonomous driving control unit 4, and actuators 5. The surrounding environment recognition unit 2, the navigation control unit 3, and the autonomous driving control unit 4 are computers that comprise a CPU or other processing unit and execute arithmetic processing.

The onboard sensors 1 are sensors that are mounted on an autonomous vehicle and acquire information about the surroundings of the host vehicle. The onboard sensors 1 include a forward recognition camera 11, a rear recognition camera 12, a right recognition camera 13, a left recognition camera 14, lidar 15, and radar 16. The onboard sensors 1 include, as sensors that acquire information required for autonomous driving control other than information about the surroundings of the host vehicle, a vehicle speed sensor, a yaw rate sensor, a turn signal switch, etc. (none of which are illustrated).

In combination, the forward recognition camera 11, the rear recognition camera 12, the right recognition camera 13, and the left recognition camera 14 configure a surroundings-recognizing camera (around view monitor (AVM)). This surroundings-recognizing camera detects objects in a travel path of the host vehicle, objects outside of the travel path of the host vehicle (road structures, leading vehicles, trailing vehicles, oncoming vehicles, neighboring vehicles, pedestrians, bicycles, motor bikes), the travel path of the host vehicle (white road lines, road boundaries, stop lines, pedestrian crossings), road signs (speed limits), etc.

As illustrated in FIG. 2, the right recognition camera 13 is a fish-eye camera that is built into a right door mirror. The right recognition camera 13 has a right white line lateral position detecting function. As illustrated in FIG. 2, the left recognition camera 14 is a fish-eye camera that is built into a left door mirror. The left recognition camera 14 has a left white line lateral position detecting function.

Right white line lateral position refers to a length to an inside edge position of a right white line WR from a position of a vehicle width direction center line CL of a host vehicle A. Left white line lateral position refers to a length to an inside edge position of a left white line WL from a position of the vehicle width direction center line CL of the host vehicle A. Right white lines WR and left white lines WL are left and right lane boundaries, and a right white line lateral position and a left white line lateral position are the results of left and right lane boundary detection.

The lidar 15 and the radar 16 are disposed at positions at the front end of the host vehicle with the output wave illumination axes thereof pointing in front of the vehicle. By receiving waves that are reflected back, the lidar 15 and the radar 16 detect presence of objects in front of the host vehicle and distances to objects in front of the host vehicle are detected. The lidar 15 and the radar 16, which are two types of ranging sensors, combine to configure lidar/radar, and, for example, a laser radar, a millimeter wave radar, an ultrasonic radar, a laser range finder, etc., can be employed therefor. The lidar 15 and the radar 16 detect positions of and distances to objects, including objects in the travel path of the host vehicle, and objects outside of the travel path of the host vehicle (road structures, leading vehicles, trailing vehicles, oncoming vehicles, neighboring vehicles, pedestrians, bicycles, motor bikes).

As illustrated in FIG. 3, the lidar 15 are swingably provided at left and right positions at the front end of the host vehicle A, pointed obliquely downward and to the right and pointed obliquely downward and to the left. The lidar 15 have a right curb lateral position detecting function and a left curb lateral position detecting function. Right curb lateral position refers to a length to an inside edge position of a right curb ER from a position of the vehicle width direction center line CL of the host vehicle A. Left curb lateral position refers to a length to an inside edge position of a left curb EL from a position of the vehicle width direction center line CL of the host vehicle A. Right curbs ER and left curbs EL are left and right road edges, and a position a prescribed distance inside a right curb lateral position and a position a prescribed distance inside a left curb lateral position are the results of left and right lane boundary detection.

The surrounding environment recognition unit 2 receives, as inputs, image data from the recognition cameras 11, 12, 13, 14 and object data from the lidar/radar 15, 16. The surrounding environment recognition unit 2 includes a calibration processing unit 21 that generates calibration data for image data and object data, and an object recognition processing unit 22 that performs object recognition processing based on the calibration data.

The calibration processing unit 21 estimates a parameter for image data from the recognition cameras 11, 12, 13, 14 and a parameter for object data from the lidar/radar 15, 16, and uses these parameters to generate and output image data and object data calibration data. For example, in the case of image data from the recognition cameras 11, 12, 13, 14, the calibration processing unit 21 uses the parameters to perform the correction, etc., of optical axes and lens distortion.

The object recognition processing unit 22 receives, as input, calibration data from the calibration processing unit 21, performs object recognition processing based on the calibration data, and outputs recognition result data. The object recognition processing unit 22, for example, performs processing comparing image data and object data, and when it has been confirmed, using the object data, that an object is present at a position for an object candidate that is based on the image data, the object recognition processing unit 22 recognizes that an object is present and recognizes what the object is.

The navigation control unit 3 receives, as input, host vehicle position information from a GNSS antenna 31, combines GPS (global positioning system) utilizing satellite communications with map data, including road information, and generates a target route to a destination from a current position using a route search. In addition to displaying the generated target routes on a map, and the navigation control unit 3 outputs the target route information.

"GNSS" is short for "global navigation satellite system," and "GPS" is short for "global positioning system." Detailed configuration of the navigation control unit 3 will be described below.

The autonomous driving control unit 4 receives, as inputs, recognition result data from the object recognition processing unit 22 of the surrounding environment recognition unit 2, and target route information from the navigation control unit 3. The autonomous driving control unit 4 generates target vehicle speeds, target rates of acceleration, and target rates of deceleration based on the input information. The autonomous driving control unit 4 derives drive control command values using a target rate of acceleration that was generated, and outputs a result of this derivation to a drive actuator 51. The autonomous driving control unit 4 derives brake control command values using a target rate of deceleration that was generated, and outputs a result of this derivation to a brake actuator 52. The autonomous driving control unit 4 derives steering control command values using target route information inputted thereto, and outputs a result of this derivation to a steering actuator 53.

The actuators 5 include the drive actuator 51, the brake actuator 52, and the steering actuator 53.

The drive actuator 51 receives, as input, a drive control command value from the autonomous driving control unit 4 and controls the drive force of a drive source. In other words, in the case of a vehicle with an engine, the drive actuator 51 is an engine actuator. In the case of a hybrid vehicle, the drive actuator 51 is an engine actuator and a motor actuator. In the case of an electric vehicle, the drive actuator 51 is a motor actuator.

The brake actuator 52 receives, as input, a brake control command value from the autonomous driving control unit 4 and controls the braking force of brakes. A hydraulic booster, an electric booster, etc., is used as the brake actuator 52.

The steering actuator 53 receives, as input, a steering control command value from the autonomous driving control unit 4 and controls the steering angle of a steering wheel. A steering angle control motor, etc., is used as the steering angle actuator 53.

Detailed Configuration of Navigation Control Unit

Detailed configuration of the navigation control unit 3, which sets a destination, derives an optimal target route, and displays the target route for autonomous driving, will be described below with reference to FIG. 1.

As illustrated in FIG. 1, the navigation control unit 3 comprises the GNSS antenna 31, a position information processing unit 32, a destination setting unit 33, a map data storage unit 34, a route search processing unit 35, a target route corrector 36, and a display device 37.

The position information processing unit 32 performs processing for detecting the latitude and longitude of stopping positions of the host vehicle and travel positions of the host vehicle based on satellite communication information inputted from the GNSS antenna 31. Host vehicle position information from the position information processing unit 32 is outputted to the route search processing unit 35.

A destination for the host vehicle is inputted into, and set in, the destination setting unit 33 via, inter alia, a touch panel operation on a display screen of the display device 37 by the driver. Destination information from the destination setting unit 33 is outputted to the route search processing unit 35.

The map data storage unit 34 is a storage unit for so-called digital map data in which latitude/longitude and map information are associated. The map data includes road information that has been associated with respective points. The road information is defined by nodes and links that connect nodes together. The road information includes information that specifies roads according to road position/area, and information indicating a type of each road, a width of each road, and road geometry. The position of intersections, the directions of approach of intersections, intersection type, and other information relating to intersections is stored in association with respective identification information for each road link in the road information. Road type, road width, road geometry, whether forward progress is permitted, right-of-way relationships, whether passing is permitted (whether entering an adjacent lane is permitted), speed limit, and other information relating to roads is also stored in association with respective identification information for each road link in the road information.

The route search processing unit 35 receives, as input, host vehicle position information from the position information processing unit 32, destination information from the destination setting unit 33, and road map information (road map data) from the map data storage unit 34. The route search processing unit 35 generates a target route by performing a route cost computation, etc., based on the road map information. GPS and a map can be used to generate a target route. Alternatively, instead of using GPS and a map, when a leading vehicle is present, a travel trajectory of the leading vehicle can be used as a target route. In such case, when the positional accuracy of GPS is low, using this travel trajectory decreases a sideways movement amount by the target route corrector 36, described below, and vehicle behavior can be made smoother.

The target route corrector 36 receives, as inputs, recognition result data from the object recognition processing unit 22, a target route from the route search processing unit 35, and road map information from the map data storage unit 34. In addition to a target route, the target route corrector 36 receives, as inputs, (left and right) lateral direction distances to white lines, (left and right) lateral direction distances to stationary objects, (left and right) lateral direction distances to curbs, a direction indicator (turn signal) in-use-by-driver condition, a lane-change condition, and information such as vehicle speed. The target route corrector 36 detects lane boundaries of the lane in which the host vehicle travels based on this input information. The target route corrector 36 compares positional relationships between lane boundaries that were detected and a target route on a map, and in situations where the target route is within a prescribed distance of a lane boundary, or in situations where the target route is on the opposite side of a lane boundary to the host vehicle, the target route is corrected with sideways movement in the lateral direction.

"Prescribed distance" refers to a distance at which a sense of unease would be imparted to the driver when the host vehicle approaches a lane boundary. For example, when the distance from the vehicle width direction center line of the host vehicle to a lane boundary is approximately 2 m (when the distance from a side of the host vehicle to a lane boundary is approximately 1 m). In situations where a target route is on the opposite side of a lane boundary to the host vehicle, the target route is corrected with sideways movement in the lateral direction no matter what the distance to the host vehicle.

The display device 37 receives, as inputs, map data information from the map data storage unit 34 and target route information from the target route corrector 36. The display device 37 displays a map, roads, a target route, a position of the host vehicle, and a destination on a display screen. In other words, during autonomous travel the display device 37 provides information visually representing the position of host vehicle on the map, such as for where the host vehicle is moving.

Overall Configuration of Target Route Corrector

Figure 4:
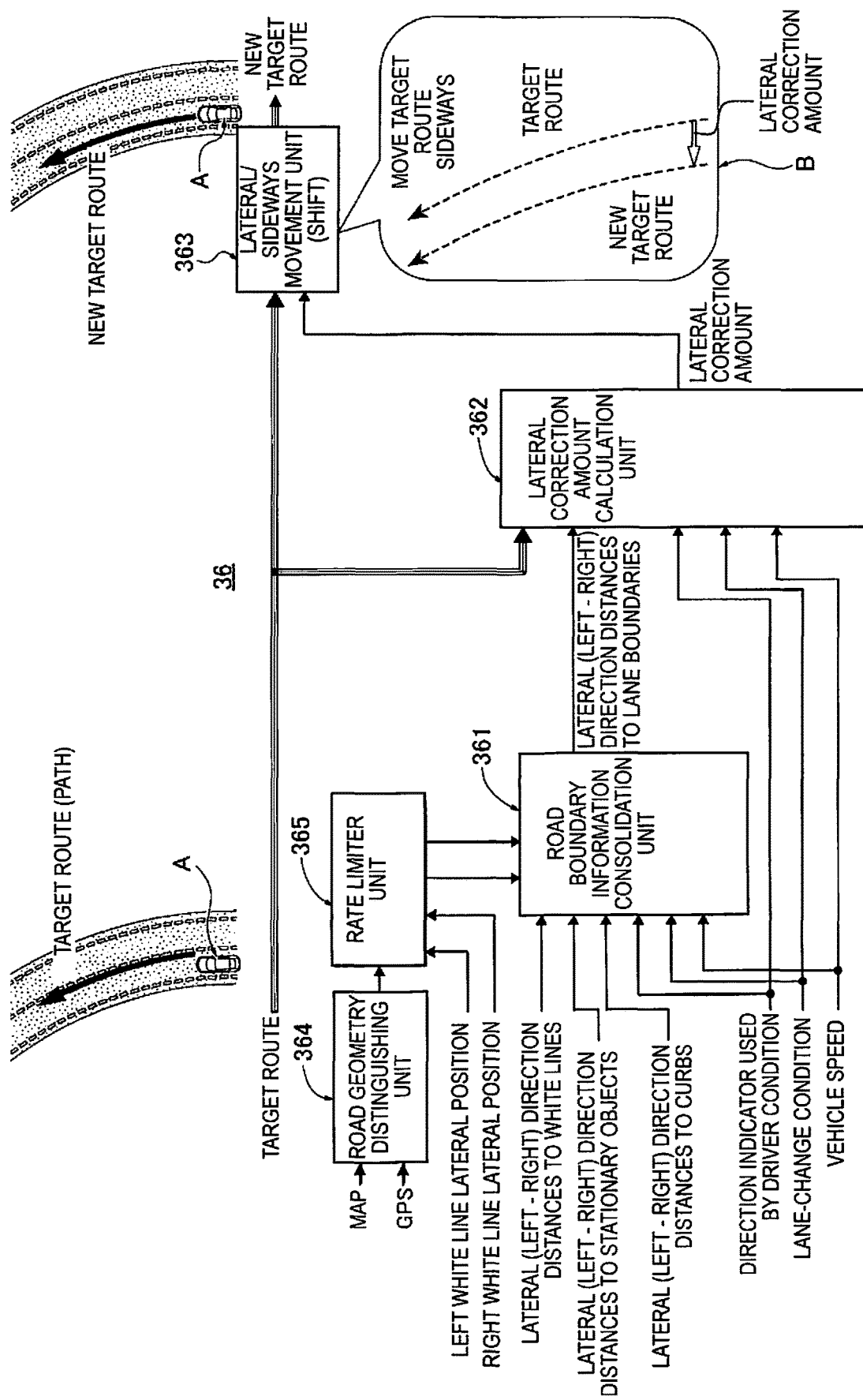
FIG. 4 is an overall block diagram illustrating a target route corrector of a navigation control unit of the first embodiment.

FIG. 4 illustrates the target route corrector 36 of the navigation control unit 3 (controller) in the first embodiment. Overall configuration of the target route corrector 36 will be described below with reference to FIG. 4.

The target route corrector 36 corrects navigational errors arising between a position of the host vehicle and a target route when the position of the host vehicle, detected using navigation information, is overlaid onto map information during autonomous travel. This correction is made with lateral/sideways movement of the target route. As illustrated in FIG. 4, the target route corrector 36 includes a road boundary information consolidation unit 361, a lateral correction amount calculation unit 362, a lateral/sideways movement unit 363, a road geometry distinguishing unit 364, and a rate limiter unit 365.

During straight-ahead travel, the road boundary information consolidation unit 361 receives, as inputs, (left and right) lateral direction distances to white lines, (left and right) lateral direction distances to stationary objects, (left and right) lateral direction distances to curbs, a direction indicator (turn signal) in-use-by-driver condition, a lane-change condition, and information such as vehicle speed. During travel in curves, in place of (left and right) lateral direction distances to white lines, the road boundary information consolidation unit 361 receives, as input, rate-limiter-applied right white line lateral positions and rate-limiterapplied left white line lateral positions from the rate limiter unit 365, and calculates (left and right) lateral direction distances to white lines. The road boundary information consolidation unit 361 detects lane boundaries of the lane in which the host vehicle A travels, and outputs (left and right) lateral direction distances to the lane boundaries, with respect to the host vehicle A, to the lateral correction amount calculation unit 362.

The lateral correction amount calculation unit 362 receives, as inputs, a target route from the route search processing unit 35, (left and right) lateral direction distances to lane boundaries from the road boundary information consolidation unit 361, a direction indicator in-use-by-driver condition, a lane-change condition, and information such as vehicle speed. The lateral correction amount calculation unit 362 compares positional relationships between lane boundaries that have been detected and a target route on a map, and in situations where the target route is within a prescribed distance of a lane boundary, or in situations where the target route is on the opposite side of a lane boundary to the host vehicle A, calculates an amount of lateral correction for the target route.

The lateral/sideways movement unit 363 receives, as inputs, a target route from the route search processing unit 35, and an amount of lateral correction from the lateral correction amount calculation unit 362. As illustrated in bubble B in the lower right part of FIG. 4, upon the calculation of an amount of lateral correction, the lateral/sideways movement unit 363 moves the target route sideways in the lateral direction by the amount of lateral correction to correct the target route, and a new target route is generated. In correcting the target route with sideways movement, a degree of alignment between a direction of progress of the host vehicle A and the new target route is able to be increased when the direction of progress of the host vehicle A and the target route diverge from one another.

The road geometry distinguishing unit 364 distinguishes curves on the planned route of travel of the host vehicle, and a direction of the curves, based on host vehicle position information from a map (road geometry information) and GPS. Upon reaching a point at which corner curvature of a curve starts to change, the road geometry distinguishing unit 364 outputs curve information to the rate limiter unit 365 only from reaching the point at which curvature starts to change until a prescribed amount of time needed to exit the curve has elapsed. The prescribed amount of time needed for a host vehicle to exit a curve is determined according to the curvature and length of the curve, and an estimated vehicle speed of the host vehicle in the curve.

The rate limiter unit 365 receives, as inputs, curve information from the road geometry distinguishing unit 364, right white line lateral positions detected by the right recognition camera 13, and left white line lateral positions detected by the left recognition camera 14. When inputted with curve information when traveling through a curve, the rate limiter unit 365 sets, of a right white line lateral position and a left white line lateral position, the result of lane boundary detection at an inside of the corner to a value for which change in a lateral direction approaching the host vehicle is restricted. In other words, a permissible rate of change permitted for a lateral speed (rate of change) in a direction in which a result of lane boundary detection approaches the host vehicle at an inside of a corner is made smaller than a permissible rate of change permitted for a lateral speed (rate of change) of a result of lane boundary detection at an outside of the corner. The rate limiter unit 365 then outputs, to the road boundary information consolidation unit 361, a rate-limiter-applied right white line lateral position and a rate-limiter-applied left white line lateral position.

Detailed Configuration of Rate Limiter Unit

Figure 5:
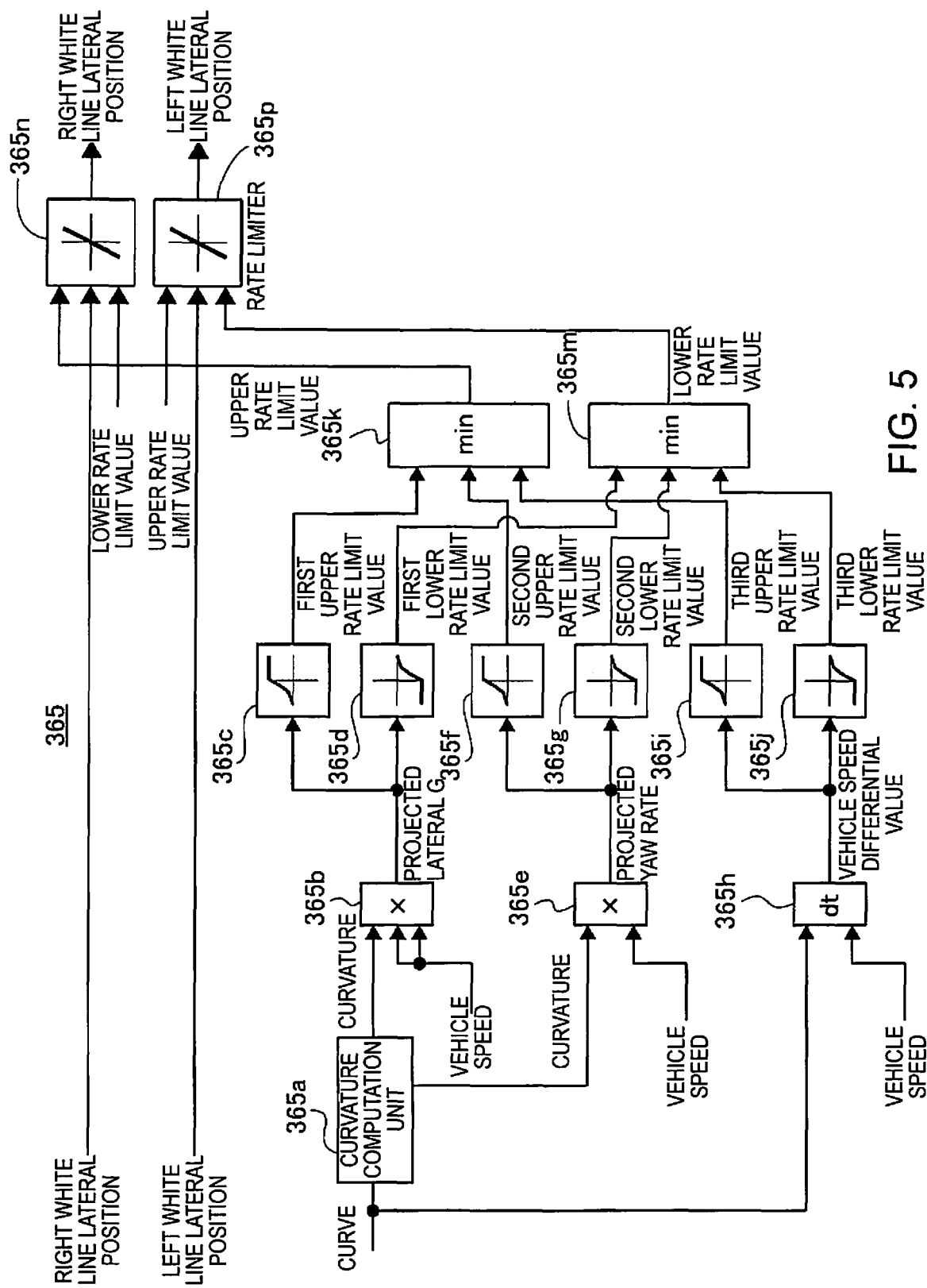
FIG. 5 is a detailed block diagram illustrating detailed configuration of a rate limiter unit in the target route corrector illustrated in FIG. 4.

FIG. 5 illustrates detailed configuration of the rate limiter unit 365 in the target route corrector 36. The detailed configuration of the rate limiter unit 365 will be described below with reference to FIG. 5.

As illustrated in FIG. 5, the rate limiter unit 365 includes a curvature computation unit 365$a$, a projected lateral G derivation unit 365$b$, a first upper rate limit value determination unit 365$c$, and a first lower rate limit value determination unit 365$d$. The rate limiter unit 365 also includes a projected yaw rate derivation unit 365$e$, a second upper rate limit value determination unit 365$f$, a second lower rate limit value determination unit 365$g$, a vehicle speed differential value derivation unit 365$h$, a third upper rate limit value determination unit 365$i$, and a third lower rate limit value determination unit 365$j$. In addition, the rate limiter unit 365 includes an upper rate limit value selection unit 365$k$, a lower rate limit value selection unit 365$m$, a right rate limiter 365$n$, and a left rate limiter 365$p$.

The curvature computation unit 365$a$ computes the curvature of a curve using road geometry that has been acquired using a map and GPS.

The projected lateral G derivation unit 365$b$ receives curvature and vehicle speed as inputs, and derives a projected lateral G using the following equations.

Curved road geometry is expressed as $y=\frac{1}{2}\rho D^2$. Herein, $\rho$ represents curvature and D represents distance in a direction of progress. $D=Vt$ when vehicle speed is defined to be V, which yields $y=\frac{1}{2}\rho V^2 t^2$. Thus, an amount of lateral movement y in a lateral direction toward a white line, as seen from a forward-progressing host vehicle over an interval $t=\tau$, can be written as $y=\frac{1}{2}\rho V^2 T^2$. In this equation for an amount of lateral movement y of a white line, $\rho V^2$ represents a lateral G that is projected. Projected lateral G is derived using the equation projected lateral $G=\rho V^2$.

The first upper rate limit value determination unit 365$c$ includes a lookup table in which projected lateral G defines the transverse axis. The first upper rate limit value determination unit 365$c$ determines a first upper rate limit value using a projected lateral G and table attributes. The first upper rate limit value is set to a value that more greatly suppresses a speed at which a right white line moves toward the left the greater the projected lateral G in a right curve.

The first lower rate limit value determination unit 365$d$ includes a lookup table in which projected lateral G defines the transverse axis. The first lower rate limit value determination unit 365$d$ determines a first lower rate limit value using a projected lateral G and table attributes. The first lower rate limit value is set to a value that more greatly suppresses a speed at which a left white line moves toward the right the greater the projected lateral G in a left curve.

The projected yaw rate derivation unit 365$e$ receives curvature and vehicle speed as inputs, and derives a projected yaw rate using the following equations.

As described above, the amount of lateral movement y of a white line can be written as $y=\frac{1}{2}\rho V^2 T^2$. In this equation for an amount of lateral movement y of a white line, pV represents a yaw rate that is projected. Projected yaw rate is derived using the equation projected yaw rate=$\rho V$.

The second upper rate limit value determination unit 365$f$ includes a lookup table in which projected yaw rate defines the transverse axis. The second upper rate limit value determination unit 365$f$ determines a second upper rate limit value using a projected yaw rate and table attributes. The second upper rate limit value is set to a value that more greatly suppresses a speed at which a right white line moves toward the left the greater the projected yaw rate in a right curve.

The second lower rate limit value determination unit 365g includes a lookup table in which projected yaw rate defines the transverse axis. The second lower rate limit value determination unit 365g determines a second lower rate limit value using a projected yaw rate and table attributes. The second lower rate limit value is set to a value that more greatly suppresses a speed at which a left white line moves toward the right the greater the projected yaw rate in a left curve.

The vehicle speed differential value derivation unit 365h receives curve information and vehicle speed as inputs, and performs a time-differentiation process on vehicle speed V to derive vehicle speed differential values, which express an amount of change in the vehicle speed V per unit of time.

The third upper rate limit value determination unit 365i includes a lookup table in which vehicle speed differential values define the transverse axis. The third upper rate limit value determination unit 365i determines a third upper rate limit value using a vehicle speed differential value and table attributes. The third upper rate limit value is set to a value that more greatly suppresses a speed at which a right white line moves toward the left the greater the vehicle speed differential value (rate of deceleration) in a right curve.

The third lower rate limit value determination unit 365j includes a lookup table in which vehicle speed differential values define the transverse axis. The third lower rate limit value determination unit 365j determines a third lower rate limit value using a vehicle speed differential value and table attributes. The third lower rate limit value is set to a value that more greatly suppresses a speed at which a left white line moves toward the right the greater the vehicle speed differential value (rate of deceleration) in a left curve.

The upper rate limit value selection unit 365k receives, as inputs, a first upper rate limit value, a second upper rate limit value, and a third upper rate limit value, and selects that having the smallest absolute value as an upper rate limit value.

The lower rate limit value selection unit 365m receives, as inputs, a first lower rate limit value, a second lower rate limit value, and a third lower rate limit value, and selects that having the smallest absolute value as a lower rate limit value.

The right rate limiter 365n receives, as inputs, a right white line lateral position detected by the right recognition camera 13, an upper rate limit value from the upper rate limit value selection unit 365k, and a lower rate limit value that is set in advance. The right rate limiter 365n limits a rate of change (lateral speed) of the right white line lateral position using the upper rate limit value and the lower rate limit value to acquire a rate-limiter-applied right white line lateral position.

The left rate limiter 365p receives, as inputs, a left white line lateral position detected by the left recognition camera 14, a lower rate limit value from the lower rate limit value selection unit 365m, and an upper rate limit value that is set in advance. The left rate limiter 365p limits a rate of change (lateral speed) of the left white line lateral position using the upper rate limit value and the lower rate limit value to acquire a rate-limiter-applied left white line lateral position.

Next, the operation will be described. The operation of the first embodiment will be described under the headings "Operation for controlling travel in a curve in a comparative example" and "Operation for controlling travel in a curve in the first embodiment."

Operation for Controlling Travel in a Curve in a Comparative Example

Figure 6:
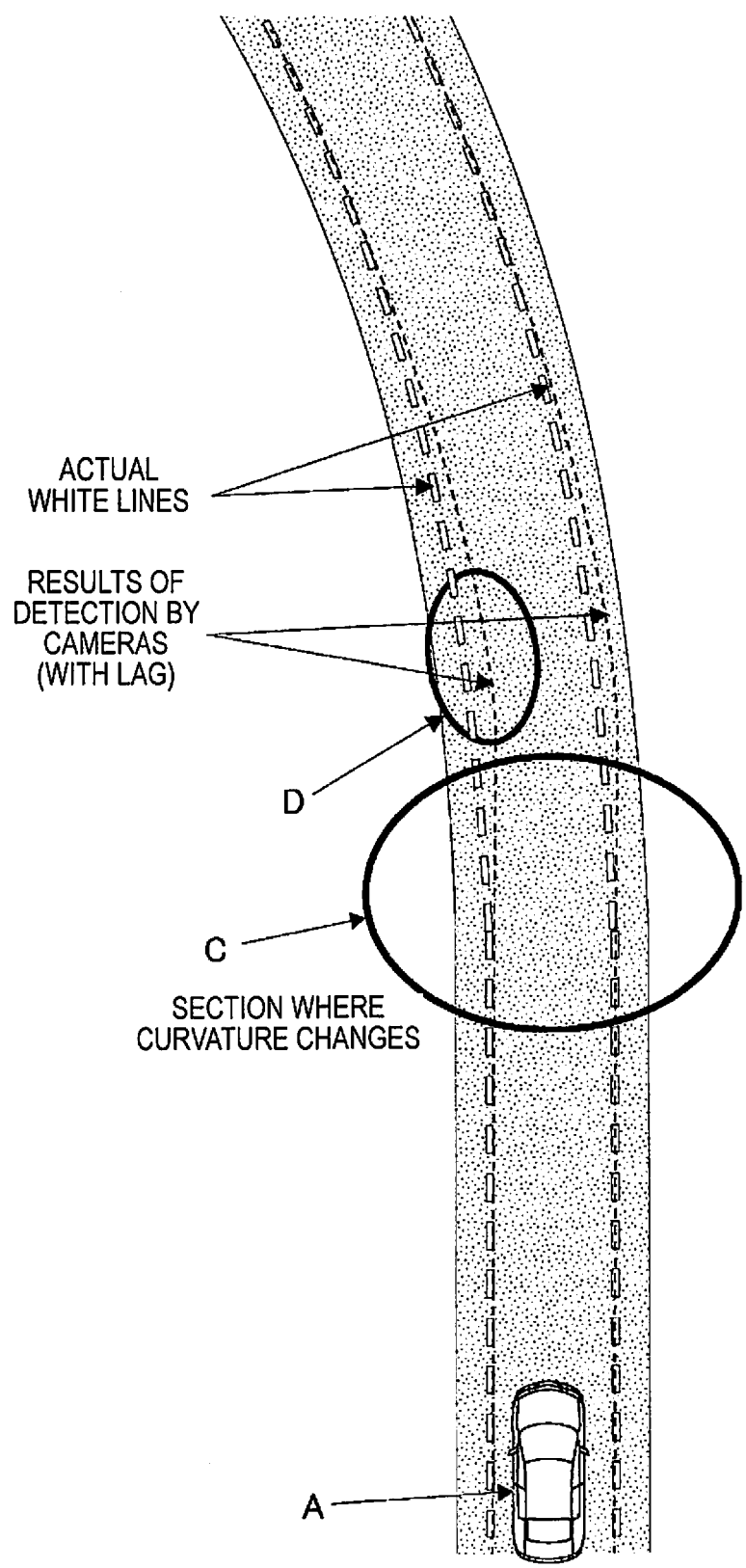
FIG. 6 is an explanatory diagram illustrating a result of lane boundary detection at an inside of a corner and a result of lane boundary detection at an outside of the corner in a comparative example when traveling through a curve.

FIG. 6 illustrates a result of lane boundary detection at an inside of a corner and a result of lane boundary detection at an outside of the corner in a comparative example when traveling through a curve. The problem of the comparative example will be described below with reference to FIG. 6. In the comparative example, left and right lane boundary detection values when traveling through a curve are directly used as results of lane boundary detection at an inside of a corner and results of lane boundary detection at an outside of the corner.

During travel in a curve, in situations where the detection of left and right white lines is performed using cameras, etc., upon reaching a location where road curvature changes (section where curvature changes C in FIG. 6), the cameras cannot keep up with changes in the lateral positions of the left and right white lines. Accordingly, as illustrated by the dashed line feature within the bounds indicated by arrow D in FIG. 6, results of detection by the cameras tend to lag behind the actual left and right white lines.

If there is lag in white line detection at an inside of a corner after passing through a section where curvature changes C, the results of detection by the cameras will take on values in a direction approaching a host vehicle A. If there is lag in white line detection at an outside of a corner after passing through a section where curvature changes C, the results of detection by the cameras will take on values in a direction moving away the host vehicle A.

Figure 7:
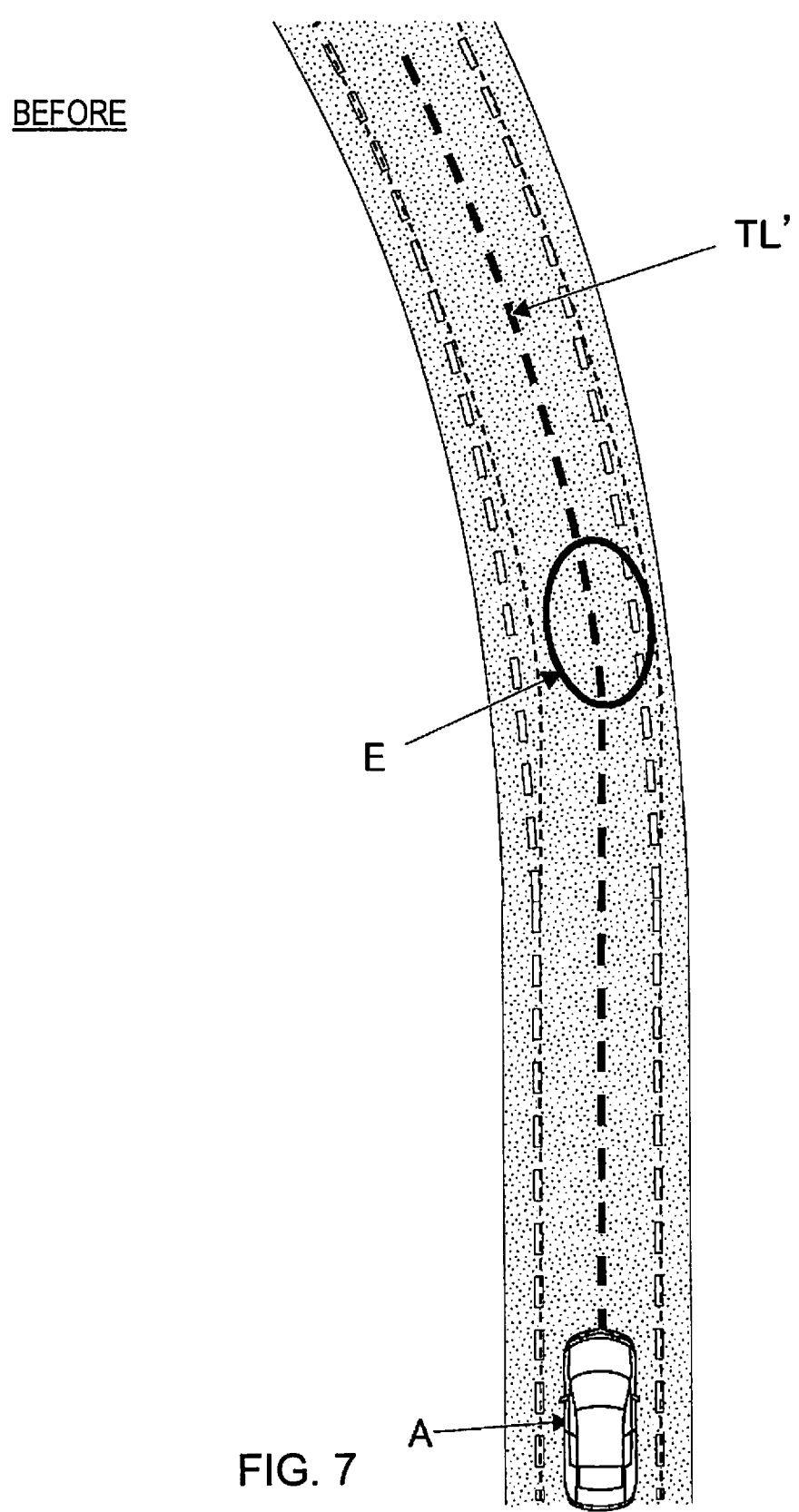
FIG. 7 is an explanatory diagram illustrating operation for controlling travel when traveling through a curve in the comparative example.

FIG. 7 illustrates operation for controlling travel when traveling through a curve in the comparative example. Operation for controlling travel in a curve in the comparative example will be described below with reference to FIG. 7.

As described above, if there is lag in white line detection after passing through a section where curvature changes C, the results of white line detection by the cameras will take on values in a direction approaching the host vehicle A at the inside of the corner and will take on values in a direction moving away the host vehicle A at the outside of the corner. The curvature of a curve recognized using the results of white line detection by the cameras will thus be greater (the radius of curvature will be smaller) than the curvature of a curve based on the actual left and right white lines, and will veer toward the outside of the corner.

Because of this, a target route TL created using a map will be corrected using the results of white line detection by the cameras, and the system will attempt to enact travel within the lane using line trace control performed with respect to the target route TL. In such case, because for a corrected target route TL' corrections act toward the outside of the curve, as shown enclosed within the boundary at arrow E in FIG. 7, the target route TL' is pulled toward the outer white line of the curve. As a result, if the host vehicle A is made to travel along the corrected target route TV, the host vehicle A will travel veering toward the outside of the corner in the section of the curve where curvature changes.

Similar operation in which a host vehicle travels veering toward an outside of a corner in a section of a curve where curvature changes arises when control whereby the host vehicle travels while maintaining a position centered between left and right white lines is performed based on results of left and right white line detection by cameras without generating a target route.

Operation for Controlling Travel in a Curve in the First Embodiment

Figure 8:
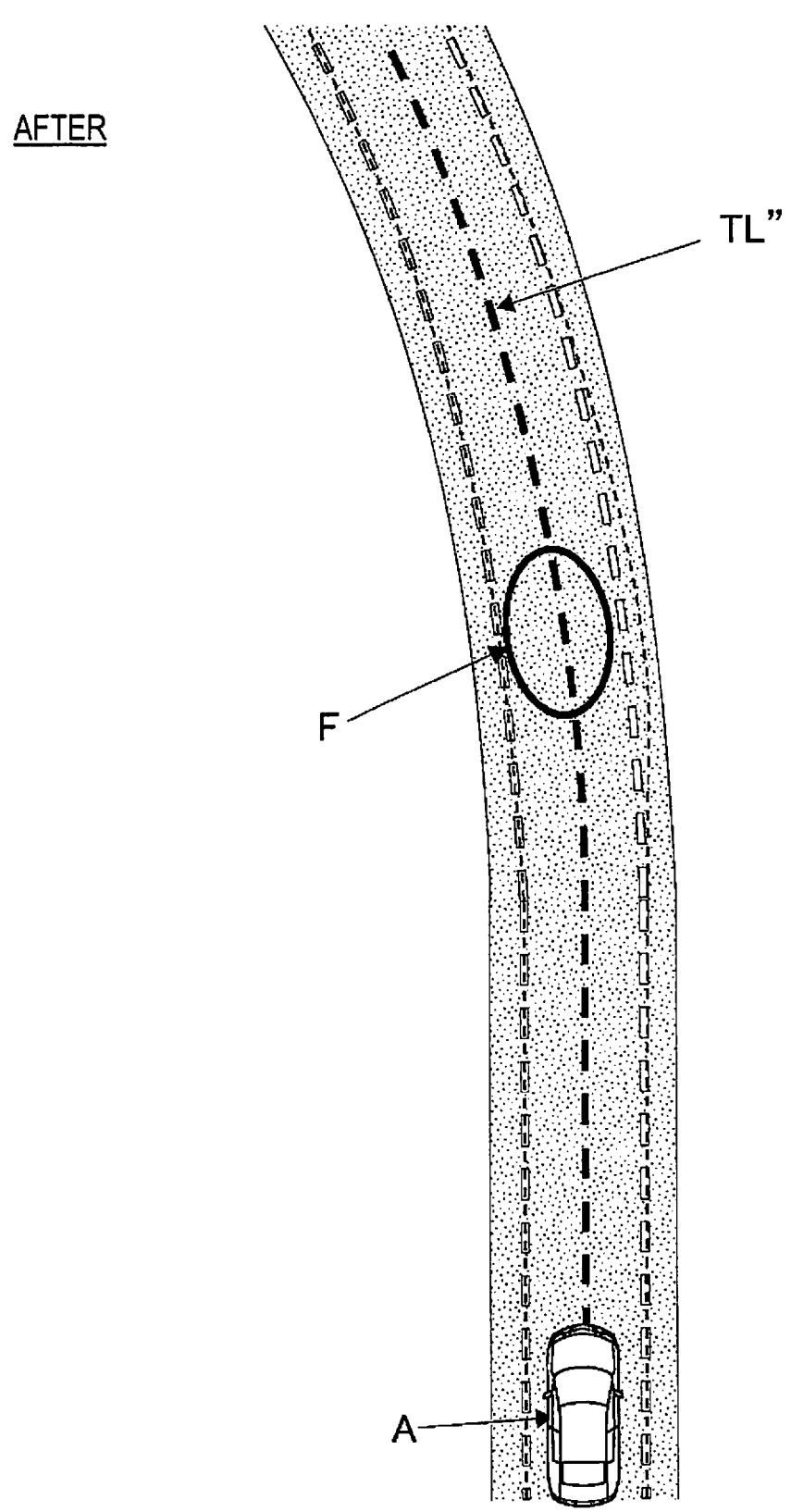
FIG. 8 is an explanatory diagram illustrating operation for controlling travel when traveling through a curve in the first embodiment.

FIG. 8 illustrates operation for controlling travel when traveling through a curve in the first embodiment. Operation for controlling travel in a curve in the first embodiment will be described below with reference to FIGS. 5 and 8.

The present invention focuses on the problem in the comparative example above. In the first embodiment, when traveling through a curve, a permissible rate of change permitted for a lateral speed in a direction in which a result of lane boundary detection approaches the host vehicle at an inside of a corner is made smaller than a permissible rate of change permitted for a lateral speed of a result of lane boundary detection at an outside of the corner.

That is, the curvature computation unit $365a$ computes a curvature of the curve using road geometry that has been acquired using a map and GPS. The projected lateral G derivation unit $365b$ receives curvature and vehicle speed as inputs, and derives a projected lateral G using the equation projected lateral $G=\rho V^2$. The first upper rate limit value determination unit $365c$ then determines a first upper rate limit value using the projected lateral G and table attributes. The determined first upper rate limit value is set to a value that more greatly suppresses a speed at which a right white line at the inside of a corner moves toward the left the greater the projected lateral G in a right curve. The first lower rate limit value determination unit $365d$ also determines a first lower rate limit value using the projected lateral G and table attributes. The determined first lower rate limit value is set to a value that more greatly suppresses a speed at which a left white line at the inside of a corner moves toward the right the greater the projected lateral G in a left curve.

The projected yaw rate derivation unit $365e$ receives curvature and vehicle speed as inputs, and derives a projected yaw rate using the equation projected yaw rate=$\rho V$. The second upper rate limit value determination unit $365f$ then determines a second upper rate limit value using the projected yaw rate and table attributes. The determined second upper rate limit value is set to a value that more greatly suppresses a speed at which a right white line at the inside of a corner moves toward the left the greater the projected yaw rate in a right curve. The second lower rate limit value determination unit $365g$ also determines a second lower rate limit value using the projected yaw rate and table attributes. The determined second lower rate limit value is set to a value that more greatly suppresses a speed at which a left white line at the inside of a corner moves toward the right the greater the projected yaw rate in a left curve.

The vehicle speed differential value derivation unit $365h$ receives curve information and vehicle speed as inputs, and performs a time-differentiation process on vehicle speed V to derive a vehicle speed differential value, which expresses an amount of change in the vehicle speed V per unit of time. The third upper rate limit value determination unit $365i$ then determines a third upper rate limit value using the vehicle speed differential value and table attributes. The determined third upper rate limit value is set to a value that more greatly suppresses a speed at which a right white line at the inside of a corner moves toward the left the greater the vehicle speed differential value (rate of deceleration) in a right curve. The third lower rate limit value determination unit $365j$ also determines a third lower rate limit value using the vehicle speed differential value and table attributes. The determined third lower rate limit value is set to a value that more greatly suppresses a speed at which a right white line at the inside of a corner moves toward the right the greater the vehicle speed differential value (rate of deceleration) in a left curve.

The upper rate limit value selection unit $365k$ receives, as inputs, the first upper rate limit value, the second upper rate limit value, and the third upper rate limit value, and of these three values, selects that having the smallest absolute value as an upper rate limit value. The lower rate limit selection unit $365m$ receives, as inputs, the first lower rate limit value, the second lower rate limit value, and the third lower rate limit value, and of these three values, selects that having the smallest absolute value as a lower rate limit value.

Next, the right rate limiter $365n$ receives, as inputs, a right white line lateral position detected by the right recognition camera 13, an upper rate limit value from the upper rate limit value selection unit $365k$, and a lower rate limit value that is set in advance. The right rate limiter $365n$ limits the rate of change (lateral speed) of the right white line lateral position using the upper rate limit value and the lower rate limit value to acquire a rate-limiter-applied right white line lateral position.

Similarly, the left rate limiter $365p$ receives, as inputs, a left white line lateral position detected by the left recognition camera 14, a lower rate limit value from the lower rate limit value selection unit $365m$, and an upper rate limit value that is set in advance. The left rate limiter $365p$ limits the rate of change (lateral speed) of the left white line lateral position using the upper rate limit value and the lower rate limit value to acquire a rate-limiter-applied left white line lateral position.

Consequently, when traveling along a right curve, even if there is lag in white line detection after passing through a section where curvature changes C, rate-limiter-applied right white line lateral positions at the inside of the corner are positions for which the speed of movement toward the left is suppressed. Further, when traveling along a left curve, rate-limiter-applied left white line lateral positions at the inside of the corner are positions for which the speed of movement toward the right is suppressed. Thus, the curvature of a curve recognized using rate-limiter-applied right white line lateral positions and left white line lateral positions is made to approach the curvature of a curve based on the actual left and right white lines.

Because of this, a target route TL created using a map will be corrected using rate-limiter-applied right white line lateral positions and left white line lateral positions, and the system will attempt to enact travel within the lane using line trace control performed with respect to the target route TL. In such case, because for a corrected target route TL" corrections are kept from acting toward the outside of the curve, as shown enclosed in the boundary at arrow F in FIG. 8, the target route TL" substantially follows a center line of the curve. As a result, even if the host vehicle A is made to travel along the corrected target route TL", the host vehicle A is able to travel without veering toward the outside of the corner in the section of the curve where curvature changes.

Next, the effects of the present disclosure will be described. The effects given below by way of example are achieved with the method and device for controlling travel of an autonomous vehicle of the first embodiment.

(1) A controller (the navigation control unit 3) is provided that detects left and right lane boundaries and that controls travel of a host vehicle based on a result of lane boundary detection. In a method for controlling travel of a drive-assisted vehicle (the autonomous vehicle), a curve, and a direction of the curve, are distinguished based on road geometry information. When traveling through the curve, a result of lane boundary detection at an inside of a corner is set to a value for which change in a lateral direction approaching the host vehicle is restricted (FIG. 8). Accordingly, a method for controlling travel of a drive-assisted vehicle (the autonomous vehicle) can be provided with which travel does not veer toward an outside of a corner in a section of a curve where curvature changes.

(2) When traveling through the curve, a permissible rate of change permitted for a lateral speed in a direction in which the result of lane boundary detection approaches the host vehicle at the inside of the corner is made smaller than a permissible rate of change permitted for a lateral speed of a result of lane boundary detection at an outside of the corner (FIG. 5). Accordingly, on top of the effect of (1), by reducing the rate of change (lateral speed) of a lateral position, a result of lane boundary detection at the inside of the corner can be prevented from approaching the host vehicle. In situations where, as in the first embodiment, target route generation and results of lane boundary detection are used in combination with one another, because results of lane boundary detection are untouched by changes to a rate of change, the host vehicle is able to travel in a lane center due to lateral correction of the target route without the loss of functionality for correcting a target route with lateral/sideways movement.

(3) When traveling through the curve, a result of lane boundary detection at an inside of a corner is set to a value for which change in a lateral direction approaching the host vehicle is restricted from a point at which corner curvature starts to change until a prescribed amount of time has elapsed (FIG. 4). Accordingly, on top of the effect of (1) or (2), in straight-ahead travel scenarios apart from curve-travel scenarios, the host vehicle is able to travel in a lane center. That is, by limiting lag in results of lane boundary detection at an inside of a corner to only conspicuous curve-travel scenarios, results of left and right lane boundary detection can be directly used in other travel scenarios.

(4) A curvature of the curve is calculated using road geometry, a projected lateral rate of acceleration (projected lateral G) is calculated using the curvature and vehicle speed, and a first upper rate limit value and a first lower rate limit value are changed according to the projected lateral rate of acceleration (FIG. 5). Accordingly, on top of the effect of (2) or (3), by changing upper and lower limits of a rate limiter according to a projected lateral rate of acceleration (projected lateral G), during travel in a curve, vehicle behavior of the host vehicle can be kept to a minimum. That is, there is a relationship whereby influence due to sensor lag increases the greater an amount of lateral movement y of a result of lane boundary detection. The amount of lateral movement y equals $\rho V^2 t^2$, and the projected lateral G equals $\rho V^2$. Thus, if a result of lane boundary detection at an inside of a corner is more greatly limited the greater the projected lateral G, the amount of lateral movement y is kept to a minimum.

(5) A curvature of the curve is calculated using road geometry, a projected yaw rate is calculated using the curvature and vehicle speed, and a second upper rate limit value and a second lower rate limit value are changed according to the projected yaw rate. Absolute values are respectively compared with that of the first upper rate limit value and the first lower rate limit value determined based on the projected lateral rate of acceleration, and whichever of these has a lower absolute value is respectively employed as an upper rate limit value and a lower rate limit value (FIG. 5). Accordingly, on top of the effect of (4), in situations where lane boundary detection is performed taking into account a yaw rate of the host vehicle, if a result of lane boundary detection at an inside of a corner is limited taking the projected yaw rate into account in addition to the projected lateral G, during travel in a curve, vehicle behavior of the host vehicle can be kept to a minimum. That is, there is a relationship whereby lane boundary detection error increases the greater the change in yaw rate, even when lateral G is the same.

(6) A vehicle speed differential value, which expresses a timewise change in vehicle speed when traveling through the curve, is calculated, and a third upper rate limit value and a third lower rate limit value are changed according to the vehicle speed differential value. Absolute values are respectively compared with that of the first upper rate limit value and the first lower rate limit value determined based on the projected lateral rate of acceleration, and whichever of these has a lower absolute value is respectively employed as an upper rate limit value and a lower rate limit value (FIG. 5). Accordingly, on top of the effect of (4), in situations where lane boundary detection is performed taking into account a yaw rate of the host vehicle, if a result of lane boundary detection at an inside of a corner is limited taking a vehicle speed differential value into account in addition to the projected lateral G, during travel in a curve, vehicle behavior of the host vehicle can be kept to a minimum. That is, because a product of curvature and vehicle speed is equal to yaw rate, a change in vehicle speed (vehicle speed differential value) becomes a change in yaw rate.

(7) Positional relationships between the lane boundary detection results and a target route generated by a technique other than left and right lane boundary detection are compared, and in situations where the target route is within a prescribed distance of the lane boundary, or in situations where the target route is on the opposite side of the lane boundary to the host vehicle, the target route is corrected with sideways movement in the lateral direction (FIG. 4). Accordingly, on top of the effects of (1) to (6), by correcting the target route, including in curves, with sideways movement rather than correcting the self-position of the host vehicle, as described above, it is possible to select whether to prioritize smoothness or to prioritize non-departure, depending on the scenario, and vehicle behavior where it is possible to feel more at ease can be achieved.

(8) A controller (the navigation control unit 3) is provided that detects left and right lane boundaries and that controls travel of a host vehicle based on a result of lane boundary detection. In a device for controlling travel of a drive-assisted vehicle (the autonomous vehicle), the controller (the navigation control unit 3) includes a road geometry distinguishing unit 364 and a detection-result change-suppressing unit (the rate limiter unit 365). The road geometry distinguishing unit 364 distinguishes a curve, and a direction of the curve, based on road geometry information. When traveling through the curve, the detection-result change-suppressing unit (the rate limiter unit 365) sets a result of lane boundary detection at an inside of a corner to a value for which change in a lateral direction approaching the host vehicle is restricted (FIG. 4). Accordingly, a device for controlling travel of a drive-assisted vehicle (the autonomous vehicle) can be provided with which travel does not veer toward an outside of a corner in a section of a curve where curvature changes.

In the foregoing, a method and device for controlling travel of a drive-assisted vehicle of the present disclosure was described with reference to the first embodiment. However, the specific configuration thereof is not limited to that of the first embodiment, and design modifications, additions, etc., are possible without departing from the spirit of the invention as set forth in the accompanying claims.

In the first embodiment, an example was presented in which target route generation and results of lane boundary detection are used in combination with one another. However, the present invention could be applied using only the results of lane boundary detection, e.g., control is performed whereby the host vehicle travels while maintaining a position centered between left and right white lines based on results of left and right white line detection by cameras.

In the first embodiment, an example was presented in which, when traveling through a curve, when a result of lane boundary detection at an inside of a corner is set to a value for which change in a lateral direction approaching the host vehicle is restricted, a rate limiter is strengthened with respect to result of lane boundary detection at the inside of the corner, and the rate limiter is weakened with respect to result of lane boundary detection at an outside of the corner. This is because to travel without veering toward an outside of a corner in a section of a curve where curvature changes, limiting results of lane boundary detection at an inside of the corner is more effective than limiting results of lane boundary detection at the outside of the corner, and because a width of the travel route is not narrowed. However, configuration could be adopted in which a result of lane boundary detection at an inside of a corner is maintained when traveling through a curve. Further, configuration could be adopted in which results of lane boundary detection at an inside of a corner and at an outside of the corner are maintained when traveling through a curve.

In the first embodiment, an example was presented in which the navigation control unit 3 is used as a controller that generates a target route to a destination from the current position of a host vehicle. However, an autonomous driving control unit could be used as a controller that generates a target route to a destination from the current position of a host vehicle. The target route generation functionality can also be split into two, whereby part of this functionality is assigned to a navigation control unit, with the remainder being assigned to an autonomous driving control unit.

In the first embodiment, an example was presented in which the method and device for controlling travel of the present disclosure are applied to an autonomous vehicle in which steering/drive/braking are automatically controlled according to an autonomous driving mode selection. However, the method and device for controlling travel of the present disclosure can be applied to any drive-assisted vehicle that assists any part of a steering operation/drive operation/braking operation by a driver. In short, the method and device for controlling travel of the present disclosure can be applied to any vehicle that assists the driving of a driver by correcting navigational error.

The invention claimed is:

1. A travel control method for controlling travel of a host vehicle comprising a controller that detects left and right lane boundaries and that controls travel of the host vehicle based on a result of lane boundary detection, the travel control method comprising:
    distinguishing a curve and a direction of the curve based on road geometry information; and
    setting the result of lane boundary detection at an inside of a corner of the curve by limiting values of the left and right lane boundaries to values for which a speed of movement from the inside of the corner of the curve toward an outside of the corner of the curve is restricted when traveling through the curve.

2. The travel control method according to claim 1, wherein
    when traveling through the curve, a permissible rate of change permitted for a lateral speed in a direction in which the result of lane boundary detection approaches the host vehicle at the inside of the corner of the curve is made smaller than a permissible rate of change permitted for a lateral speed of the result of lane boundary detection at the outside of the corner of the curve.

3. The travel control method according to claim 2, further comprising
    calculating a curvature of the curve using road geometry, calculating a projected lateral rate of acceleration using the curvature and vehicle speed, and changing a first upper rate limit value and a first lower rate limit value according to the projected lateral rate of acceleration.

4. The travel control method according to claim 3, further comprising
    calculating a projected yaw rate using the curvature and vehicle speed,
    changing a second upper rate limit value and a second lower rate limit value according to the projected yaw rate; and
    respectively comparing absolute values of the second upper rate limit value and the second lower rate limit value with that of the first upper rate limit value and the first lower rate limit value determined based on the projected lateral rate of acceleration, and respectively employing whichever of these has a lower absolute value as an upper rate limit value and a lower rate limit value.

5. The travel control method according to claim 3, further comprising
    calculating a vehicle speed differential value, which expresses a timewise change in vehicle speed when traveling through the curve, and changing a third upper rate limit value and a third lower rate limit value according to the vehicle speed differential value; and
    respectively comparing absolute values of the third upper rate limit value and the third lower rate limit value with that of the first upper rate limit value and the first lower rate limit value determined based on the projected lateral rate of acceleration, and respectively employing whichever of these has a lower absolute value as an upper rate limit value and a lower rate limit value.

6. The travel control method according to claim 1, wherein
    when traveling through the curve, the result of lane boundary detection at the inside of the corner of the curve is set to a value for which the speed of movement from the inside of the corner of the curve toward the outside of the corner of the curve is restricted from a point at which corner curvature starts to change until a prescribed amount of time has elapsed.

7. The travel control method according to claim 1, further comprising
    comparing positional relationships between the lane boundary detection results and a target route generated by a technique other than left and right lane boundary detection, and correcting the target route with a sideways movement amount in the lateral direction in situations where the target route is within a prescribed distance of one of the left and right lane boundaries, or in situations where the target route is on the opposite side of the one of the left and right lane boundaries with respect to the host vehicle.

8. A travel control device for controlling travel of a host vehicle comprising:
a controller that detects left and right lane boundaries and that controls travel of the host vehicle based on a result of lane boundary detection,
the controller being configured to:
distinguish a curve and a direction of the curve based on road geometry information; and
set the result of lane boundary detection at an inside of a corner of the curve by limiting values of the left and right lane boundaries to values for which a speed of movement from the inside of the corner of the curve toward an outside of the corner of the curve is restricted when traveling through the curve.

* * * * *